S. COOPER.
MACHINE FOR HANDLING FISH.
APPLICATION FILED SEPT. 30, 1915.

1,267,850.

Patented May 28, 1918.
6 SHEETS—SHEET 2.

Fig. 2.

Witness
Chas M Peard

Simon Cooper
Inventor
By Frank J Kent
His Attorney

S. COOPER.
MACHINE FOR HANDLING FISH.
APPLICATION FILED SEPT. 30, 1915.

1,267,850.

Patented May 28, 1918.
6 SHEETS—SHEET 3.

Witness

Simon Cooper
Inventor
By Frank J. Kent
Attorney

S. COOPER.
MACHINE FOR HANDLING FISH.
APPLICATION FILED SEPT. 30, 1915.

1,267,850.

Patented May 28, 1918.
6 SHEETS—SHEET 4.

S. COOPER.
MACHINE FOR HANDLING FISH.
APPLICATION FILED SEPT. 30, 1915.

1,267,850.

Patented May 28, 1918.
6 SHEETS—SHEET 6.

UNITED STATES PATENT OFFICE.

SIMON COOPER, OF NEW YORK, N. Y., ASSIGNOR TO GORTON-PEW FISHERIES COMPANY, OF GLOUCESTER, MASSACHUSETTS, A CORPORATION OF MAINE.

MACHINE FOR HANDLING FISH.

1,267,850.

Specification of Letters Patent.  Patented May 28, 1918.

Application filed September 30, 1915.  Serial No. 53,288.

*To all whom it may concern:*

Be it known that I, SIMON COOPER, a citizen of the United States, residing at New York, in the county of New York and State of New York, have invented certain new and useful Improvements in Machines for Handling Fish, of which the following is a specification.

This invention relates broadly to apparatus for treating fish or the like, the present embodiment disclosing a machine which serves thus to treat a fish by cutting its throat, slitting its belly and removing its entrails and gills, all by automatic means.

In the drawings, which show an embodiment of the invention as at present preferred, and wherein like characters of reference refer to like parts, Fig. 13 is an end view of a fish-supporting trough and showing two chain-carried gripper-carriages, looking from the left of Fig. 1 and with one of two tracks for said gripper-carriages in section; Fig. 14 is a detail of one of said gripper-carriage's conveyer or fish-gripping fingers shown in Fig. 13 disclosed in an opened position; Fig. 15 is a detail of one of the two fish-alining angle-pieces shown in Fig. 13; and, Fig. 16 is a view of a belly-slitting saw, the fish-guiding trough and a fish presumably traveling longitudinally of the latter, looking from the left of Fig. 1.

To aid an intelligent following of the structural description of this embodiment of the invention, which will, of course, precede a description of operation, certain functional contemplations should be made clear.

Figure 1:
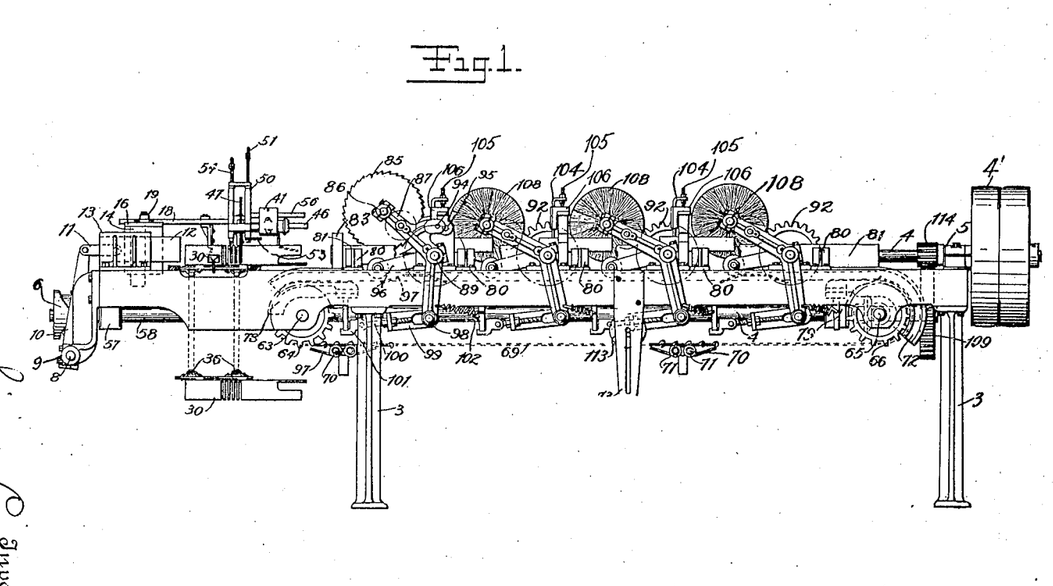
Figure 1 is a side elevation of the complete embodiment.

Note, then, that there are three shafts extending lengthwise of the machine. There is shaft 4, the driving shaft, which is driven from pulleys 4'; and which terminates toward the left end of Fig. 2 at a convenient point not illustrated. A very short shaft 39 (Fig. 2) is located above shaft 4. The longest of the said three lengthwise shafts is shaft 58 (Figs. 1 and 2) that extends from end to end of the machine. All three of these shafts are arranged one above the other (Fig. 1). For purposes of clarity, shaft 39 is permitted to be hidden by parts between it and the observer, of Fig. 1.

Figure 2:
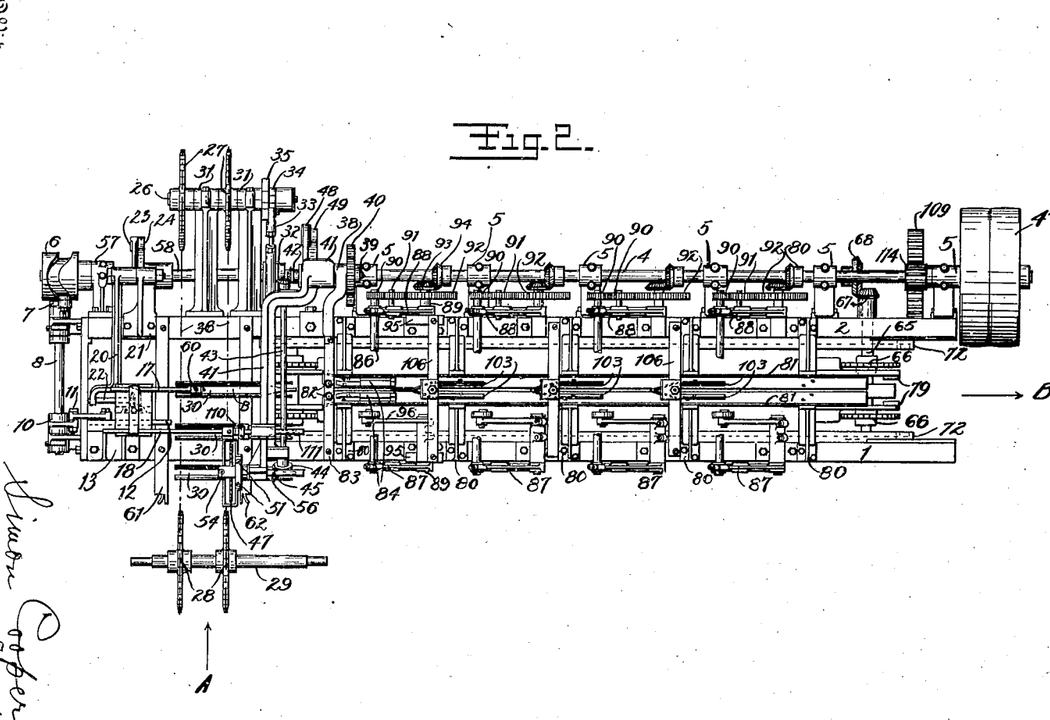
Fig. 2 is a plan view of same.

Shafts 4 and 58 are coupled by gear 109 and pinion 114 (Figs. 1 and 2). Shafts 4 and 39 are coupled by gear 40 on shaft 39 (Fig. 2) and a similar gear, unillustrated, but carried by shaft 4.

The uppermost shaft, or shaft 39, causes, through a transverse shaft 43, the continuous revolution of only the revoluble fish-treating element 47 of the five such elements, 47, 85, 108, 108 and 108 (Fig. 1); the element 47 (Figs. 1, 5 and 6) being the only one which is arranged transversely of the machine and being that one which slits the throat of each fish as a first treatment after said fish is fed into the machine. This transversely working element 47 and all of its supporting and driving parts, including the said shaft 43, are carried by a swing arm 41 (Figs. 2, 6, 7 and 8) that is at suitable intervals raised and lowered without interfering with the working of miter gears 42 (Fig. 2).

These up and down movements of saw 47, which properly time actuations of certain fish-alining and clamping devices (Figs. 5 to 8, inclusive) located in the vicinity of said saw, are initiated by certain cams (Figs. 2, 3 and 4) mounted on the lowermost shaft 58.

In addition, this shaft 58 not only drives longitudinal chains 72, but also lateral chains 36, the former continuously by way of beveled gears 68 (Fig. 2) and the latter intermittently by way of an eccentric 32 and a connecting rod 33, coupling sprocket shaft 26 and said shaft 58.

The driving shaft 4, through the separate gear chains shown in Fig. 2, continuously revolves the belly-slitting saw 85 and each of the entrail-wiping sweeps or brushes 108; and each of these just mentioned revolving elements is also predeterminedly raised and lowered (Figs. 10 and 11); and consequently in each of said gear trains the pinions 90 and 91 are supported for translation about the gear 92.

In the present instance the feeding-in attendant places a fish in each of the intermittently moving buckets 30 (Fig. 2) so that a fish is transported by this receiving bucket as indicated by the arrow A shown in Fig. 2.

At the proper time the chains 36 and said buckets are halted so that a fish carried by one of said buckets lies under saw 47. When the throat of said fish is slit by saw 47 (Fig. 1), the fish body is transferred from said bucket onto said trough, as hereinafter and in this preamble described.

When, after said bucket has gone on and been again predeterminedly halted beneath the rod 18 (Figs. 1, 3 and 4) and the hook 59 has descended into the fish's throat-slit and then has ascended therefrom to leave the severed gill remaining in said bucket, the bucket has received another forward impulse and been predeterminedly halted in line with the trough-plates 81 (Fig. 2). Thereafter, and until exit from the machine as indicated by the arrow B, shown in Fig. 1, said fish is continuously slid along the V-shaped trough established by the inclined trough-plates 81 (Figs. 2 and 13), as the result of being predeterminedly engaged by a pair of finger-grippers 74 (Fig. 14) and by the subsequent actuation of the latter removed from said bucket and onto said trough.

Figure 12:
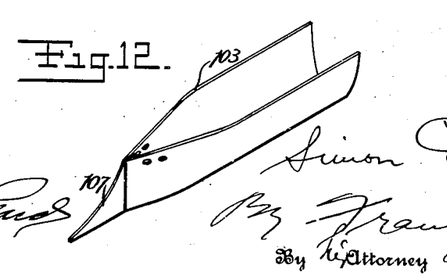
Fig. 12 is a detail view of a plow.
Figures 13, 14, 15, 16:
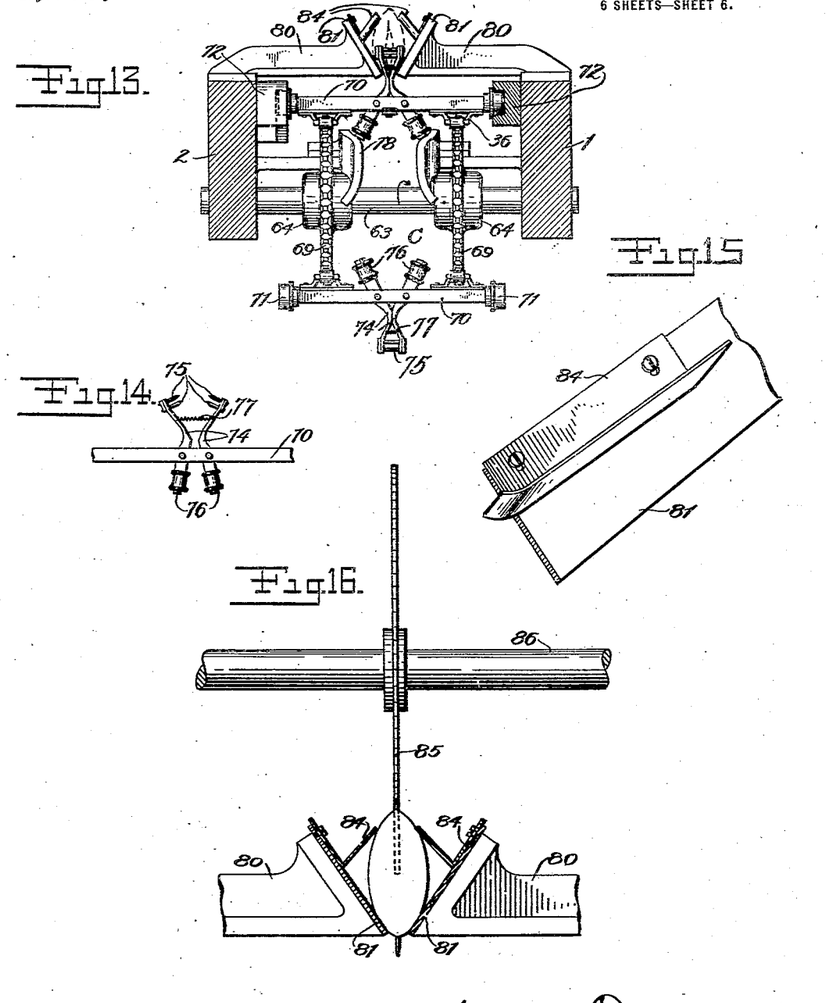

The spaced gripper carriages 70 (Figs. 1, 13 and 14), each of which carries a pair of said grippers, are pivotally mounted upon and thus continuously move with chains 72. When the particular gripper-carriage now being considered has traveled in the direction of the arrow C of Fig. 13 beyond the narrowed throat portion of cam tracks 78 (Figs. 13 and 1), retractile spring 77 (Fig. 14) is permitted to destroy the abnormal set of finger grippers 74 (Fig. 14) and restore said finger grippers to their normal or fish-engaging disposition (Fig. 13). Until the cam-tracks 79 located at the right end of Fig. 2 are engaged by rollers 76 (Fig. 14), the gripper-carriage 70 last mentioned slides its gripped fish tail first along the V-shaped trough aforesaid rightwardly of Figs. 1 and 2; thereby in succession, subjecting said fish to the various continuously revolving and intermittently and properly depressed belly-slitting saw 85 and entrail-brushing sweeps 108; in the case of each of said sweeps 108 a separate fixedly-located plow 103 (Fig. 12) entering the belly-slit created by saw 85 and flaring open said slit to aid the functioning of the adjacent sweep. As said gripper-carriage 70 reaches the exit end of the machine at the right of Fig. 2 and starts to travel around the sprockets 66, said cam tracks 79 force the pin-ends of fingers 74 apart, thereby to release the fish so that it may by gravity drop into a proper receptacle 70 or the like.

Immediately following is a purely structural description of the machine above broadly considered.

Referring to Figs. 1 and 2 the parallel side frames 1 and 2 are rigidly mounted on standards 3. Brackets 5 are fastened to frame 2 and carry in them main shaft 4 on the free end of which are mounted tight and loose driving pulleys.

Figure 3:
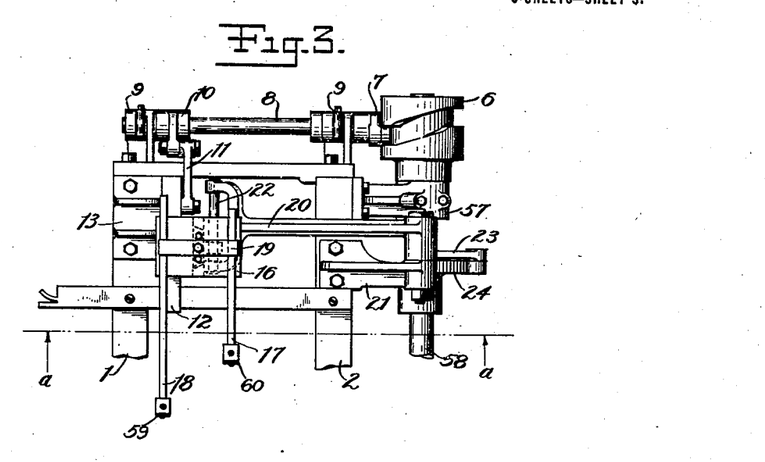
Fig. 3 is a detail plan of parts operating a gill remover.
Figure 4:
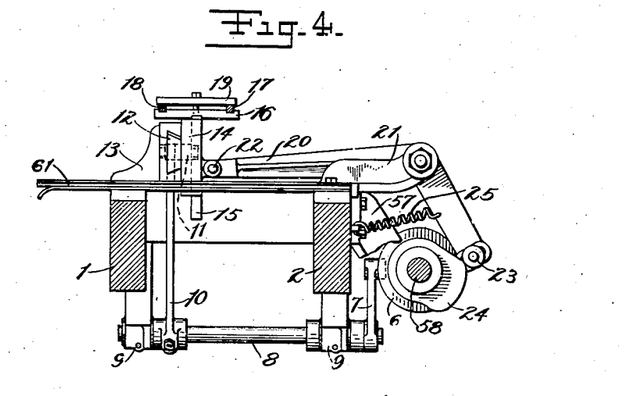
Fig. 4 is the same as Fig. 3 looking in direction of A—A.

As shown at the left in Fig. 2, and in Figs. 3 and 4, to an end of shaft 58 is fastened a track-cam 6; and engaging with the latter is a lever 7 attached to a rock-shaft 8 held in suitable bearings 9 at the ends of frames 1 and 2. Rock-shaft 8 carries a lever 10 to the free end of which lever is loosely bolted a link 11, which link is connected to a horizontal slide 12. A bracket 13 fastened to side frame 1 has ways in it to accommodate horizontal slide 12, and fastened at right angles to slide 12 is guide piece 14 formed to accommodate a vertical slide 15. Slide 15 has its top formed into a table 16, and a clamp 19 serves to hold adjustable rods 17 and 18.

Still referring primarily to Figs. 3 and 4, a lever 20 pivoted in the end of a bracket 21 which is fastened to frame 2 has its inner end bifurcated, the bifurcation being spanned by a rod 22. A boss (Fig. 4) on slide 15 has a slotted hole to accommodate rod 22. At the outer end of lever 20 is a roller stud 23 engaging with a cam 24 fastened to a shaft 58; and a retractile spring 25 tends to maintain said roller in contact with the cam (Fig. 4).

As best shown in Fig. 2, a pair of brackets 31 extending from frame 2 have mounted in them a short shaft 26 to which is fastened the sprockets 27. Another short shaft 29 parallel to and oppositely of shaft 26 and supported at a convenient point carries sprockets 28. Connecting these four sprockets are a pair of sprocket chains 36 which carry at fixed distances buckets 30.

An eccentric cam, the presence of which is indicated at 32 in Fig. 2, and fastened to shaft 58, causes a connecting rod 33 to oscillate for each revolution of said shaft. A lever 34 supported on a shaft 26 is connected to rod 33 and said lever's free end carries a pawl which engages with a ratchet wheel 35. As ratchet wheel 35 is fastened to shaft 26, each revolution of shaft 58 will cause shaft 26, sprockets 27 and chains 36 to advance the buckets 30 the distance separating one bucket from another.

Referring primarily to Figs. 5, 6, 7 and 8, each bucket 30 is riveted through its bottom to a reinforcing piece 30' which is fastened to the two chains 36. The opposite sides of each bucket 30 diverge so as to conform somewhat to the shape of the fish (Fig. 6), and near the middle portion of each side a plurality of slots 37 (Figs. 5, 7 and 8) are cut for purposes which will presently appear.

Referring to Fig. 2, a bracket 38 fastened to frame 2 carries a shaft 39 fastened to one end of which is gear 40 meshing with a similar gear fastened to a shaft 4. A swing arm 41 (see also Figs. 5, 7 and 8) is loosely mounted on the shaft 39, and on one extreme end of said shaft is fastened a miter pinion 42 which meshes with a similar pinion fastened to a shaft 43 mounted in suitable bores in swing arm 41. The opposite extreme end of shaft 43 carries a miter gear 44 which engages with a similar gear 45 (gear 45 being shown in Fig. 5), fastened to a spindle 46 mounted in the free end of swing arm 41 and said spindle carries a circular throat-slitting saw 47. The swing arm 41 has an extension 48 (Fig. 2) which rides upon a suitably shaped cam 49 (Fig. 2) fastened to shaft 58, to predetermine that once in each revolution of said shaft the swing arm will carry the saw 47 partly into one of the slots 37 shown in Figs. 5 and 6.

Figure 5:
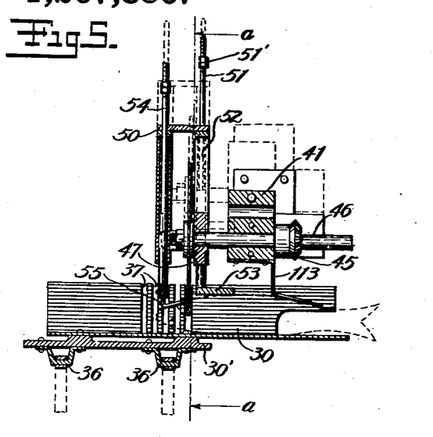
Fig. 5 is an end view of a fish-holding bucket and a throat-slitting mechanism.
Figure 6:
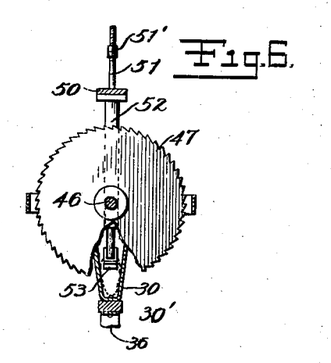
Fig. 6 is a side view of the parts shown in Fig. 5 looking in direction of A—A.

Fastened to the swing arm 41 by means of an adjustable rod 56 is a yoke 50 (Figs. 1 and 5). This yoke carries a double rod plunger 51 (see particularly Fig. 1 for the double-rod feature) which is movable in a vertical direction within the yoke and is maintained in its lowest position by means of a compression spring 52 (Fig. 5) and is adjustable by means of a suitable lock-nut 51' as shown in Fig. 5. The lower portion of the plunger 51 is formed into a heel 53 (Fig. 5). Another plunger 54 is similarly mounted in the yoke 50 but on the opposite side of the saw 47, and its lower portion is formed into a bent finger 55 (Fig. 5).

By referring to Fig. 2 it will be noted that the plungers 51 and 54 are in line with one of the buckets 30. In line with the preceding bucket is a plunger 110 (Figs. 7 and 8) held in a rod 111 adjustably carried by swing arm 41. The lower portion of this plunger 110 is formed into a heel-piece 110' (Figs. 7 and 8), a compression spring 112 serving to force the heel of the plunger 110 against the body of a fish in the bucket.

Figures 7, 8, 9, 17:
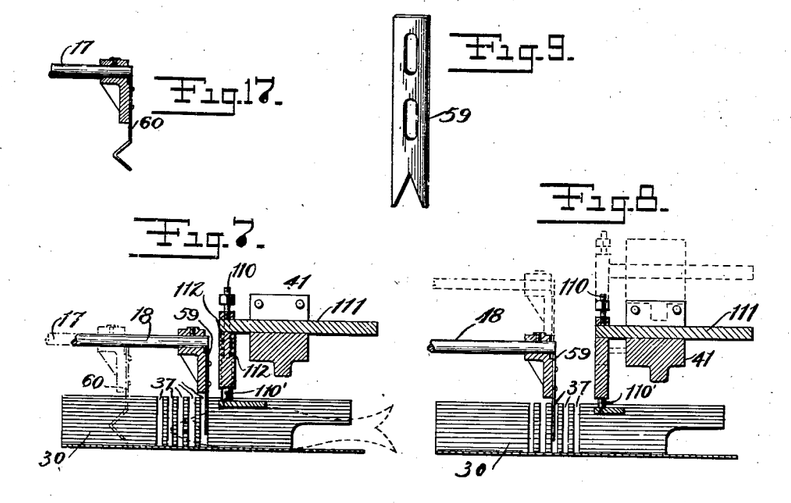
Fig. 7 is a detail side view of the gill remover.
Fig. 8 is the same as Fig. 7 with the parts in other positions.
Fig. 9 is a detail view of a hook associated with the gill remover.
Fig. 17 is a detailed view of the blade for sundering the gills from the entrails and removing them from the trough.

The rod 18, in line with plunger 110 (compare Figs. 2, 3 and 4 and 7) carries at its free end a blade 59 (see Fig. 9), and a rod 17 is similarly equipped with a bent blade 60 (see Fig. 17). It will be noted by referring to Fig. 2 that the rod 18 with its blade centers in one of the buckets 30 while the rod 17 with its respective blade coincides with the center of the preceding bucket. The oppositely facing but similar grooved tracks 61 and 62 (the former shown also in Fig. 4) carried by frames 1 and 2 laterally of the machine serve to support the buckets by engaging with the ends of the reinforcing piece 30' which is, as was described in connection with Fig. 5, a part of each bucket.

Referring to Figs. 1, 2 and 13, a shaft 63 mounted between frames 1 and 2 supports two sprockets 64 and another shaft 65 (shown only in Figs. 1 and 2) mounted at the other end of frames 1 and 2 and at the exit end of the machine has fastened to it similar sprockets 66. The shaft 65 extends beyond frame 2 sufficiently to carry a beveled pinion 67 (Fig. 2) which meshes with a beveled gear 68 fast on shaft 58 (Fig. 2). A spur gear 109 carried on shaft 58 (Fig. 2) meshes with a pinion 114 (Fig. 2) fastened to shaft 4 (Fig. 1). An endless sprocket chain 69 is laid around each pair of sprockets 64 and 65 and these chains support between them at fixed distance from each other gripper-carriages 70 (Figs. 1, 13 and 14).

Referring particularly to Figs. 13 and 14, each gripper-carriage 70, has a pair of flanged wheels 71 at each end which travel in the tracks 72, the said tracks being curved to coincide with the travel of chains 69 around the sprockets 64 and 65 (as shown only in Fig. 1). A weighted idler 113 moving in a slotted bracket 73, one bracket being fastened to each side frame (see the lower center portion of Fig. 1), is designed to keep chains 69 taut. Pivoted between the two chassis-rods (Figs. 13 and 1) of gripper-carriage 70 are a pair of gripper-fingers 74 (Figs. 13 and 14). Each gripper-finger has at its upper end a series of pins 75 while its lower end carries a roller 76 (Figs. 13 and 14). A retractile spring 77 serves normally to pull the upper ends of each finger 74 toward its mate (Figs. 13 and 14).

A pair of cam tracks 78 (Figs. 1 and 13) fastened to the side frames at a point in proper relation to the location of sprockets 64 serve, by engaging the rollers 76, to force the pin ends of the fingers 74 away from each other, and as the carriage moves around the said sprocket the rollers ride off these cam tracks thus allowing the pin ends of the fingers to close on each other by means of the spring 77 to pierce and engage with a fish lying in the bucket additionally marked B in Fig. 2. This closed fish-engaging position of the pin fingers prevails for the travel of the gripper-carriage from the sprockets 64 to the sprockets 65 (Figs. 1 and 2), where another pair of cam tracks 79 (Fig. 2) causes the pin ends of the fingers 74 to withdraw from each other and release said fish.

Brackets 80 (Figs. 1 and 2) extending inwardly from each side frame support trough plates 81 (Figs. 2 and 13). These trough plates are inclined to each other so that the bottom edges are spaced just sufficiently to permit the narrowed portions of the gripper fingers 74 to travel between them. At the forward end of the trough composed of plates 81 are placed a pair of conical guide rollers 82 (Figs. 2 and 10) which are carried by a bridge 83 extending between the two side frames. Immediately back of these conical rollers and resting in a slidable position on the trough plates 81 are guides or angle-pieces 84 (Figs. 10, 13, 15 and 16). Each angle piece has a pair of slotted holes through which screws loosely hold it in position to its respective trough plate 81 (Fig. 15), the forward end of each guide piece being slightly flared (Figs. 13 and 15).

Figure 10:
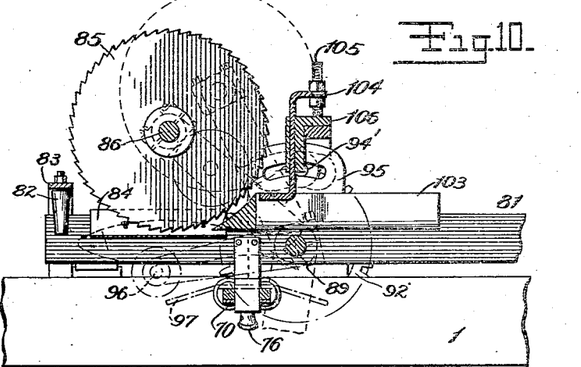
Fig. 10 is a detail side view of a belly-slitting mechanism.

A slitting saw 85 carried on a spindle 86 (Figs. 1, 2 and 10) is positioned to move down between the guide pieces 84 (Figs. 10 and 13) and is carried by means of lever arms 87 and 88 (Figs. 1, 2 and 10) each of which has a pivot stud 89 fastened to it (Figs. 2 and 10). As shown in Fig. 2, one end of the saw spindle has fastened to it a pinion 90 meshing with an idler pinion 91 carried by a stud fastened to arm 88; and on the pivot stud 89 is loosely mounted a gear 92 to which is fastened a miter gear 93 meshing with a similar gear 94 on shaft 4. Each of the lever arms 87 and 88 has an extension carrying a bolt 94' (Fig. 10) which slides in a segment slot of a standard 95 on each of side frames 1 and 2 (Figs. 2 and 10). A lever 96 fastened to one of studs 89 (Figs. 2 and 10) carries a roller which is in the path of a cam plate 97 (Figs. 1 and 10) carried on each of the gripper-carriages 70.

Lever arms 87 and 88 (Figs. 1 and 2) extend sufficiently below the side frames 1 and 2 to be connected therebelow by a brace rod 98 (shown only in Fig. 1 and thereby merely in side elevation) which serves to lock the two lever arms rigidly in relation to each other. Brace rod 98 is encompassed by a slottted stop-piece 99 (Fig. 1) which is pivotally carried by an adjusting eye-bolt 100 supported by a suitable bracket 101 fastened between the side frames 1 and 2. A retractile spring 102 (Fig. 1) tends to keep the saw 85 depressed to its lowest position, the slot in the stop-piece 99 serving as a limit to the downward or normal set of saw 85.

Figure 11:
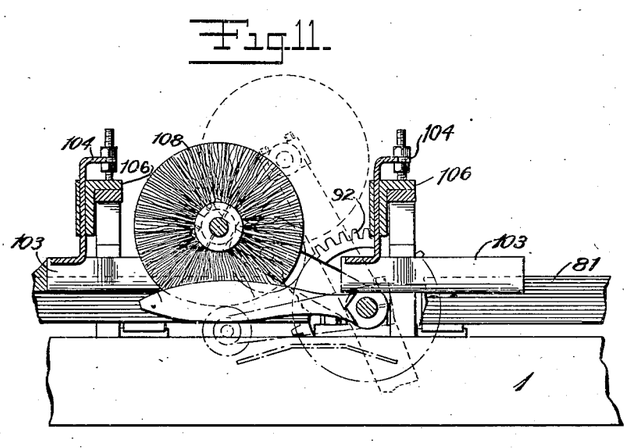
Fig. 11 is a detail side view of an entrail-brushing mechanism.

A series of parts similar to spindle 86, lever arms 87 and 88, stop-piece 99 and gears 90 and 94 are utilized to support circular brushes 108. The only difference in these last mentioned lever arms from those of the saw spindle 86 being the omission from the former of the bolt 94 and segment slot 95; all as shown in Fig. 11.

Immediately ahead of each of a plurality of brushes 108 and in line with saw 85 is a plow 103 (Figs. 2, 11 and 12) supported by an arm 104 (Fig. 11) which can be adjusted as to height on stud 105 (Fig. 11) by means of the lock nuts shown. Each stud 105 is rigidly carried by a cross piece 106 extending across the side frames (Fig. 2). The foremost plow 103 has its nose 107 (Fig. 12) formed so that the same can be placed closely adjacent the tooth edge of the saw 85 (Fig. 10). Only the foremost plow is provided with the nose 107 of Fig. 12, but each plow is enlarged so that its main section conforms roughly to the angle made by the trough-plates 81 yet leaving space between it and the said plates. The foremost plow extends back sufficiently to blanket a portion of the foremost brush, 108, and each of the other plows similarly blankets another one of said brushes.

The above structural description completed, attention is directed to the following description of operation, much more detailed than that preliminary one hereinbefore set forth in the preamble.

Referring to Figs. 1 and 2, power is applied to the main shaft 4 through the tight pulley on the end of said shaft, and thus causes the continuous rotation of the saws 47 and 85 and circular brushes 108, and the continuous travel of chains 69 with gripper-carriage 70, through the gearing and connections mentioned before. As the buckets 30 are forced to move forward one spacing per revolution of shaft 58, it results that a bucket will be located in line with the trough 81 at a time when one of the gripper carriages 70 is passing around the sprockets 64 and into said trough.

An attendant places one fish in each of the buckets 30 before said buckets reach the circular saw 47, the tail of the fish pointing to the discharge end of the machine, so that the portion of the neck to be cut through is in line with the particular slot 37 in which the saw 47 will descend as indicated in Figs. 5 and 7. The eccentric 32 causes a loaded bucket to come to a momentary rest under the saw 47, when the arm 41 is forced down by reason of the cam 49 and lever 48. This motion carries saw 47 into one of the slots in the said bucket and just before said saw engages with the neck of the fish the heel piece 53 and bent finger 55 contact with the fish and hold it firmly while the saw continues to descend and saws through the flesh portion of the neck.

The further motion of cam 49 causes the saw and plungers to ascend, whereupon the bucket chains 36 are given another impulse and the bucket containing the fish with the cut neck stops under the rod 18. The cam 6, acting through rocker arm 8 and link 11, have caused the cross head 16 to bring the rods 17 and 18 to their inner position so that the blade 59 coincides with the same slot in which the saw 47 has acted; and as the bucket is brought to rest said cross head is caused to descend by reason of lever 20 and cam 24. Plate 59 then enters into the slit made by the saw in the neck of the fish. As the swing arm 41 has descended coincidently with the downward motion of cross head 16, the heel of plunger 110 carried on said arm is contacted with the body of the fish, a compression spring 112 acting upon said plunger so that the heel piece can exert some pressure on the fish body and yet yield to prevent damaging the flesh of the fish.

When the blade 59 is down to its lowest position in the neck of the fish, cam 6, acting upon rocker shaft 8 and link 11, causes the cross head 16 to travel away from the fish, thus withdrawing the hook 59 through the jaws of the fish. As this hook is of a form, shown in Fig. 9, to grasp or engage the gills in the head of the fish, these gills by the withdrawing action of the blade 59 are torn free so that they rest on the bottom of the bucket 30. Acting in the same bucket is the flexible member 113 fastened to the lower side of swing arm 41, and this member on the downward action of said swing arm 41, presses the tail of the fish against the lower side 114 of the bucket so as to be in position to receive the pin fingers 74 when the bucket reaches its next station (Figs. 2, 5 and 8). At the completion of the withdrawing stroke of the hook 59, the cross head 16 and arm 41 ascend as shown in dotted position in Fig. 8, and the bucket is given another impulse forward. This motion brings the bucket in line with the trough 81.

It will be noted that the portion of the bottom of the bucket where the fish tail rests is cut away almost to a point and that the sides of the bucket are cut away; the purpose of which is to permit the approaching pin ends of the fingers 74 to close in on the tail of the fish with the least motion.

As the carriage 70 which is rounding the sprockets 63 at the moment that the pins 75 have passed the cut-away portion in the sides of the bucket, the fingers 74 are forced together by the combination of the spring 77, rollers 76 and cam plates 78, thus permitting the pins to pierce the tail portion of the fish and draw it into the trough 81. Just before the pin fingers engage with the fish the cross head 16 has caused rod 17 with its blade 60 to pinch the gill lying in the bucket against the bottom so that as the fish is drawn into the trough the gill will be sundered from the entrails and the withdrawing action of the cross head 16 will tumble the gill out of the hind end of the bucket.

As the pin fingers on a gripper-carriage 70 draw a fish into the trough 81, the body portion of the fish is acted upon by the conical rollers 82 to line up said fish so that the center line along its belly will travel exactly in the middle of said trough. The angle-pieces 84 will tend to maintain the fish in such position while the slitting saw 85 is cutting through the belly. To prevent contact of the saw 85 with the pin fingers 74 and also to prevent cutting through the tail portion of the fish, which should preferably be left intact, the cam-plate 97 on the gripper-carriage 70 forces up the saw's lever 96 and its arms 87 and 88 and thus keeps said saw out of contact with the fish until the pin fingers 74 and the tail portion of the fish are safely past. Then the saw 85 descends to its normal position, the spring 102 facilitating this and the brace 98 bringing up against the end in the slot in stop-piece 99. In Fig. 1 the saw 85 has completed its descent; and the position shown in dotted lines in Fig. 10 is its highest or abnormal position.

As the fish is passing saw 85, the foremost plow 103 enters the belly cut and forces the two walls of flesh apart so that the fish body will be open for the introduction of the circular brush which, being acted upon by the cam-plate 97 attached to the carriage 70 to raise the brush while the tail of the fish is passing, enters into the open body of the fish and the rotary motion of the brush forces out all the entrails. To insure complete cleansing one or more extra brushes, controlled and operated in the same manner as the first one, may be employed; and in some instances water may also be used in sufficient quantities to aid in a thorough cleaning.

As the gripper-carriage 70 starts to travel around the sprockets 65, cam tracks 79 (Fig. 2) at the exit end of the machine force the pin ends of fingers 74 apart, and thus release the fish to drop into a suitable receptacle.

To permit of adjustment for different sized fish, the series of slots 37 in each bucket will accommodate the neck saw 47 at different positions, while the tails of the different sized fish are in the same relative position to the cut-away portion of the bucket. The rods 17, 18, 56 and 11, carrying the various above-described plungers and blades, can be adjusted to coincide with the position of the saw 47.

It will thus be seen that I have provided a new and valuable machine for treating a fish by cutting its throat, removing its gills, slitting its belly and cleaning out its entrails, automatically transporting the fish and subjecting it to means to attain these results, in the presence of important cooperant auxiliaries whereby the fish is not at all damaged and is certain to be properly treated prior to exit from the machine.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claims is intended to cover all the generic and specific features of the invention herein described and all statements of the scope of the invention which, as a matter of language might be said to fall therebetween.

I claim:

1. In an apparatus of the class described, a machine including a neck cutting and gill removing mechanism in combination with a belly slitting and entrail removing means.

2. In an apparatus of the class described, a machine including an initially operating neck cutting and gill removing mechanism, in combination with a subsequently operating belly slitting and entrail removing means.

3. In an apparatus of the class described, a machine including a transversely operating neck cutting means, and a gill removing means in combination with a longitudinally belly slitting and entrail removing means.

4. In an apparatus of the class described, in combination, a fish-treating machine including neck-cutting and gill-removing mechanism, means for feeding a fish laterally of the machine, and means for thereafter automatically feeding the fish longitudinally of the machine.

5. In an apparatus of the class described, in combination, a fish treating machine including means for feeding the fish through the machine in a plurality of directions, a neck cutting and gill removing means located in one path of direction and a belly slitting and entrail removing means located in the other.

6. In an apparatus of the class described, in combination, a fish treating machine including means for feeding the fish laterally and then longitudinally through the machine, a neck cutting and gill removing means located in one path of movement of the feeding means and a belly slitting and entrail removing means located in the other.

7. In a machine for cleaning fish, in combination, a neck-cutting saw, a series of receptacles or buckets each provided with a plurality of saw slots for conveying the deposit therein of fish and supported and guided for travel at right angles to the cutting plane of the saw, means for adjusting the saw relative to the slots in the receptacles or buckets and means for removing said buckets transversely of the working zone of the saw.

8. In a machine for cleaning fish, in combination, a neck-cutting saw, a series of receptacles or buckets for conveying the deposit therein of fish and supported and guided for travel at right angles to the cutting plane of the saw, means for removing said buckets transversely of the working zone of the saw, the buckets traveling sidewisely and being open-ended to accommodate various sizes of fish and carrying a series of transverse slots, means for predeterminedly translating said saw to enter one of said slots, means for continuously revolving said saw, and means for adjusting said saw whereby, upon the operation of said translating means, said saw will enter a particular one of said slots.

9. In a machine for cleaning fish, in combination, a neck-cutting saw, a series of receptacles or buckets for conveying the deposit therein of fish and supported and guided for travel at right angles to the cutting plane of the saw, means for removing said buckets transversely of the working zone of the saw, the buckets traveling sidewisely and being open-ended to accommodate various sizes of fish and carrying a series of transverse slots, means for predeterminedly translating said saw to enter one of said slots, means for continuously revolving said saw, means for adjusting said saw whereby, upon the operation of said translating means, said saw will enter a particular one of said slots, movable fish-holding means adjacent said cutting plane, and means adapted to cause said holding means to hold the fish firmly while the saw is cutting through the neck of the fish.

10. In a machine for cleaning fish, in combination, a neck-cutting saw, a series of receptacles or buckets for conveying the deposit therein of fish and supported and guided for travel at right angles to the cutting plane of the saw, means for removing said buckets transversely of the working zone of the saw, the buckets traveling sidewisely and being open-ended to accommodate various sizes of fish and carrying a series of transverse slots, means for predeterminedly translating said saw to enter one of said slots, means for continuously revolving said saw, means for adjusting said saw whereby, upon the operation of said translating means, said saw will enter a particular one of said slots, movable fish-holding means adjacent said cutting plane but normally removed from said buckets, and means adapted to cause said holding means to enter a bucket to hold a fish firmly while the saw is cutting through the neck of said fish.

11. In a machine for cleaning fish, means for holding the fish, means for slitting the fish's neck, means for grasping the gill, and means for disconnecting said gill from its connections in the head of the fish.

12. In a fish dressing machine comprising a neck cutting and gill removing means, in combination with a belly slitting and entrail removing means, and means for holding the fish during each operation.

13. In a fish dressing machine comprising a neck cutting and gill removing means, in combination with a belly slitting and entrail removing means for clamping the fish during the neck cutting and gill removing operations and means for grasping and conveying the fish under the belly slitting and entrail removing means.

14. In a fish dressing machine comprising a neck cutting and gill removing means, in combination with a belly slitting and entrail removing means, means for holding the fish during each operation and means for sustaining the fish in an upright position during the belly slitting and entrail removing operations.

15. In a fish dressing machine comprising a neck cutting and gill removing means, in combination with a belly slitting and entrail removing means, means for holding the fish during each of said operations, and a trough including two inclined sides and movable angle pieces for sustaining the fish in an upright position during the belly slitting and entrail removing operations.

16. In a fish dressing machine consisting of a neck cutting and gill removing means in combination with a body slitting and entrail removing means.

17. In a fish dressing machine consisting of a plurality of body slitting means, in combination with cleaning means associated with each of said body slitting means.

18. In a fish-cleaning machine, in combination, means for cutting the neck of the fish, means for removing the gill of the fish, a plurality of buckets for receiving and conveying the fish, an endless chain on which said buckets are mounted, means for intermittently advancing said chain, and means for holding each bucket in predetermined adjacency to the neck-cutting means and to the gill-removing means.

19. In a fish-cleaning machine, in combination, means for cutting the neck of the fish, means for removing the gill of the fish, a plurality of buckets for receiving and conveying the fish, an endless chain on which said buckets are mounted, means for intermittently advancing said chain, means for holding each bucket in predetermined adjacency to the neck-cutting means and to the gill-removing means, and a conveyer mechanism traveling at an angle to said chain and adapted predeterminedly to engage with a fish body when a bucket carrying said fish body is halted as aforesaid.

20. In a fish-cleaning machine, in combination, a conveyer mechanism for a fish and passing in predetermined adjacency to a predetermined point whereat said fish is located, said conveying means including a plurality of pivoted pin-fingers in a normal separation, and means for controlling the separation of said pin-fingers whereby the latter are forced abnormally together to pierce the body of and engage with the fish at said location and to maintain said pin-fingers in engagement with the fish thereafter, thereby to cause the travel of said fish simultaneously with a travel over a predetermined path of said conveyer means.

In testimony whereof I affix my signature.

SIMON COOPER.